Patented Dec. 25, 1951

2,580,190

UNITED STATES PATENT OFFICE 2,580,190

DYESTUFFS OF THE ANTHRAQUINONE SERIES

Albin Peter and Jacques Günthart, Basel, Switzerland, assignors to Sandoz A. G., Basel, Switzerland, a Swiss firm No Drawing. Application May 23, 1950, Serial No. 163,786. In Switzerland June 3, 1949

12 Claims. (Cl. 260—373)

The present invention relates to violet dyestuffs of the anthraquinone series.

The class of dyestuffs known as the 1-amino-4-arylaminoanthraquinones comprise a number which are technically valuable dyestuffs. These are reddish- to greenish-blue dyestuffs. Violet dyestuffs are obtained by introducing an ether group in the 2-position.

German Patent No. 263,423 (see also French Patent No. 447,196, British Patent No. 26944/11, U. S. Patent No. 1,038,589) discloses the preparation of a violet dyestuff by reacting 1-amino-2-bromo-4-p-toluidoanthraquinone by heating with alkali phenolate, and sulfonating the resultant base. The dyestuff is still strongly bluish, not very bright, and bleeds upon fulling with concomitantly-fulled white wool.

The dyestuffs of Swiss Patents Nos. 189,647, 194,096 and 194,097 (see also British Patent No. 483,950, U. S. Patent No. 2,117,569 and French Patent No. 822,780), which are obtained by reacting 1-amino-2-sulfo-4-(2',6'-dimethyl)- and -(2',4',6'-trimethyl)-phenylaminoanthraquinones with polyvalent alcohols and ethers thereof, followed by sulfonation are indeed pure violet dyestuffs of great brightness, but they can not today be regarded as fulling dyestuffs.

It has been proposed to improve the fastness to fulling of 1-amino-2-phenoxy-4-arylaminoanthraquinone dyestuffs (see, for instance, British Patent No. 477,535, French Patent No. 823,832, Swiss Patents Nos. 199,189 and 199,190, and U. S. Patent No. 2,113,054) by substituting the arylamino radical by long-chain alkyls (8 to 20 carbon atoms). The dyestuffs dye wool in brilliant blue shades — especially reddish-blue shades. By using p-cresol, p-chlorophenol or 2-naphthol instead of phenol, a purer blue may be obtained.

No dyestuff of the type here under consideration has heretofore been produced which combines a pure violet shade with good fastness to fulling and to light.

It is a primary object of the present invention to provide a class of anthraquinone dyes, distinguished from comparable known dyes by their pure violet shade and also by their very good fastness to fulling and to light—this being a combination of properties which, as aforesaid, has not hitherto been realized in this type of dyestuff.

It has been found that this desideratum is fulfilled by the group of dyes obtained by heating an anthraquinone derivative which corresponds to the formula

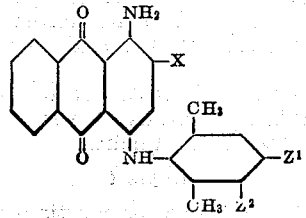

wherein X stands for Br or —SO₃H, Z¹ stands for hydrogen or methyl, and Z² stands for hydrogen or, when Z¹ is methyl, also for methyl, with a phenol which is substituted by a hydrocarbon radical containing 4 to 8 carbon atoms, in presence of an acid-binding agent, and then sulfonating the resultant dyestuff base.

The resultant dyestuffs correspond to the following formula

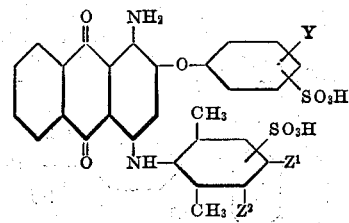

wherein Y stands for an alkyl or cycloalkyl group containing 4 to 8 carbon atoms and Z¹ and Z² have the significances hereinbefore set forth.

Suitable starting materials for the preparation of the new dyestuffs according to the present invention are, for example, 1-amino-2-bromo-4-(2',6'-dimethyl)-phenylaminoanthraquinone, 1-amino-2-bromo-4-(2',4',6'-trimethyl)-phenylaminoanthraquinone, 1-amino-2-bromo-4-(2',3',4',6'-tetramethyl)-phenylaminoanthraquinone and the corresponding 2-sulfonic acids or their alkali metal salts. As phenols, use may advantageously be made of, for example, p-tert. butyl phenol, p-sec. amyl phenol, p-cyclohexyl phenol, p-iso-octyl phenol, etc.

The process for carrying out the preparation of the said new dyestuffs according to the invention may advantageously be as follows:

The starting materials are heated in the reagent phenol itself or in a diluent, such as nitrobenzene, di-p-tert. butyl-p-cresol, methylhexaline and the like, in the presence of an acid-binding agent, such as a hydroxide, carbonate or acetate of an alkali metal, preferably of potassium or sodium. The temperatures for carrying out the conversion of the 2-bromo compounds are generally lower than in the case of the sulfonic acid compounds. In any event, the conversion can be carried to a conclusion at about 200° C. within a useful period of time. In practice, it is also possible to work at appreciably lower temperatures, for example at 140° C. In the case of the 2-bromo compounds, any tendency toward the formation of high-molecular compounds can be avoided by a somewhat increased alkali concentration.

The dyestuff base can be obtained by diluting the melt with alcohol, whereupon it separates out in crystalline form. In some cases, a product is obtained which is also suitable for the preparation of the corresponding dyestuff, by submerging the melt, in the absence of any water-insoluble solvent, in warm dilute caustic soda solution and then filtering off the separated base.

For the sulfonation, the dyestuff base is dissolved in sulfuric acid monohydrate and stirring is effected, if necessary with addition of oleum, at 20–50° C. until water-solubility is realized. The dyestuff is isolated in the conventional way by pouring into salt water, filtering and neutralization.

The following examples illustrate the invention, without being limitative thereof. The parts and percentages are by weight.

Example 1

15 parts of a 50% aqueous caustic potash solution are added to 100 parts of molten p-tert. butyl phenol and the temperature of the melt then raised to 180° C., water distilling off. 18 parts of the condensation product from 1-amino-2-sulfo-4-bromo-anthraquinone and 2,4,6-trimethylaniline (mesidine) are then added and stirring continued at the aforesaid temperature until a test specimen in water is completely insoluble. After the temperature has dropped to 100° C., the mass is diluted with 150 parts of methanol, and cooling continued down to room temperature, whereupon the base, which corresponds to the formula

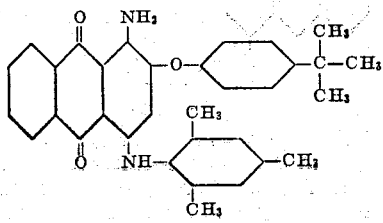

separates out in crystallized form and is filtered off. The base dissolves in benzene with a pure violet coloration and in concentrated sulfuric acid with a violet coloration which changes to violet-blue upon addition of formaldehyde.

10 parts of this base are dissolved in 45 parts of sulfuric acid containing 9% of free sulfuric acid anhydride. This solution is stirred at 40° C. until a test specimen is completely soluble in water. The sulfonation mass is then poured into a mixture of ice and water, and the dyestuff is precipitated by the addition of common salt. The new dyestuff, thus obtained, dissolves in water with a violet coloration and in concentrated sulfuric acid with a red coloration. The sulfuric acid solution turns toward the blue upon addition of formaldehyde. The dyestuff dyes nitrogenous fibers, such as wool, silk, tussah and nylon in bright violet shades from a weak acid bath. The dyeings on wool are characterized by excellent wet fastness properties and are also fast to light.

Example 2

A mixture of 10 parts of a 50% aqueous caustic potash solution, 16 parts of iso-octyl phenol and 50 parts of nitrobenzene is heated to 150° C. and is dried by passing a current of air thereover. 16 parts of 1-amino-2-bromo-4-mesidino-anthraquinone are added and the mixture stirred at the aforesaid temperature until a test specimen drawn through benzene no longer turns more reddish. After cooling to 100° C., it is diluted with 100 parts of methanol and the base which crystallizes out is filtered off at room temperature. The base is the 1-amino-2-iso-octylphenoxy-4-mesidino-anthraquinone:

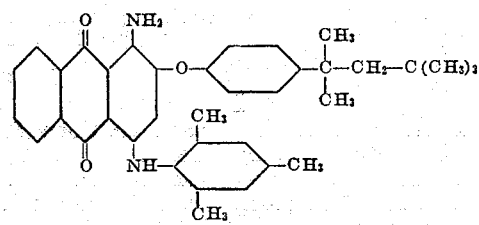

This base is sulfonated by dissolving 10 parts thereof in 45 parts of 9% oleum and stirring for ½ hour at 45° C. The dyestuff, which corresponds to the formula

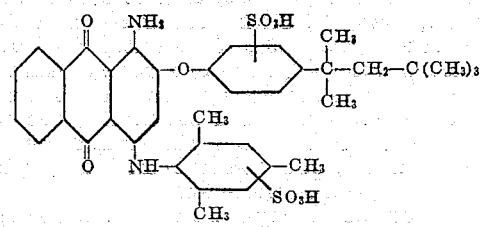

is worked up as in the preceding example. It is obtained as a violet powder which dissolves in water with a violet coloration. The solution in concentrated sulfuric acid is red with a violet tinge, becoming blue on addition of formaldehyde. The dyestuff dyes wool bright violet from a weakly acid bath. The dyeing is excellently fast to fulling.

Example 3

15 parts of 1-amino-2-sulfo-4-mesidino-anthraquinone (sodium salt) are introduced into a molten mixture of 80 parts of iso-octyl phenol and 15 parts of a 50% aqueous caustic potash solution. The temperature is raised to 180° C., water distilling off. The melt is stirred at this temperature for 12 hours. Upon completion of the reaction, the dyestuff base is separated, as previously described, by precipitation with methanol and is worked up according to the preceding examples.

By replacing 60 parts of the 80 parts of iso-octyl phenol by a solvent, such a di-p-tert. butyl-p-cresol, the same dyestuff base is obtained.

By sulfonation, the dyestuff of Example 2 is obtained.

Example 4

15 parts of a 50% aqueous caustic potash solution are poured into a melt of 70 parts of p-tert. amyl phenol, and the water is distilled off, while passing a stream of air over the mass, until a temperature of 180° C. is reached. Thereupon 13.35 parts of the condensation product from 1-amino-2-sulfo-4-bromo-anthraquinone and 2,6- dimethylaniline (vic.-m-xylidine) are introduced. After stirring for 15 hours at 180° C., the condensation is complete. The temperature is allowed to drop to 80° C., dilution effected with 100 parts of methanol, the mass further cooled down to room temperature, and the dyestuff base which crystallizes out filtered off. The base dissolves in benzene with reddish coloration, in concentrated sulfuric acid with orange-red coloration and in formaldehyde-containing sulfuric acid with violet coloration.

5 parts of the base are dissolved in 20 parts of sulfuric acid monohydrate, 10 parts of 28% oleum are added, and stirring carried out at 30° C. until a test specimen is completely soluble in water. The sulfonation mass is then poured into a mixture of ice and salt water, containing 10% of sodium chloride, and the separated dyestuff is suction-filtered off, washed neutral with salt water and dried. The dyestuff dissolves in water with a bright red-violet coloration, and in sulfuric acid with a red coloration. The sulfuric acid solution turns toward the violet-blue upon addition of formaldehyde. The dyestuff, corresponding to the formula

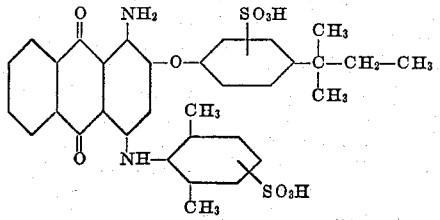

yields a dyeing on wool which is bright violet, and of very good fastness to fulling and to light.

Example 5

18 parts of the sodium salt of 1-amino-2-sulfo-4-vic.-m-xylidino-anthraquinone are dissolved in a melt of 120 parts of p-sec. amyl phenol, and 15 parts of a 50% aqueous caustic potash solution are added. While driving off the water, the temperature of the resultant mass is raised to 180° C. and stirring is continued at this temperature until a test specimen is completely insoluble in boiling water. Thereupon the base is worked up as in the preceding examples.

5 parts of the obtained dyestuff base are introduced into 30 parts of 9% oleum and kept at between 30 and 45° C. until a test specimen is completely soluble in water. The dyestuff is isolated in the same way as the dyestuffs of the preceding examples. In dry state, it is a violet powder. It dissolves in water with a violet coloration, and in concentrated sulfuric acid with a violet-tinged red coloration which, upon addition of formaldehyde, changes toward the blue. It dyes wool in bright violet shades which are fast to fulling and to light.

Example 6

A mixture of 60 parts of p-cyclohexylphenol and 10 parts of a 50% aqueous caustic soda solution is heated to drive off water, until a temperature of 180° C. is reached, 11 parts of 1-amino-2-sulfo-4-vic.-m-xylidino - anthraquinone (sodium salt) are added, and condensation allowed to continue for 24 hours at 180° C. After cooling to 120° C., the mass is diluted with methanol and the crystallized base is suction-filtered off and washed with warm methanol. 5 parts of this base are dissolved in 50 parts of 10% oleum and the solution stirred at 35-45° C. until a test specimen is clearly soluble in water. The dyestuff dissolves in water with a bright red-violet coloration, and in concentrated sulfuric acid with a red coloration which, upon addition of formaldehyde, turns toward the violet-blue. It dyes wool in bright violet shades of outstanding fastness to fulling and to light.

Example 7

By replacing the 18 parts of 1-amino-2-sulfo-4-mesidino-anthraquinone in Example 1 by 16 parts of the condensation product from 1-amino-2-sulfo-4-bromo-anthraquinone and 2,3,4,6-tetramethylaniline (iso-duridine), and otherwise proceeding according to the said example, there is obtained a crystalline dyestuff which dissolves in benzene with a red-violet coloration, and in concentrated sulfuric acid with a violet-tinged red coloration which, upon the addition of formaldehyde, changes toward blue-violet.

5 parts of this new base are dissolved in 20 parts of sulfuric acid monohydrate and 12 parts of 28% oleum. After stirring for one-half hour at 45° C., a test specimen will be clearly water-soluble. The mass is poured into an aqueous sodium chloride solution of 10% concentration, cooled with ice down to 0° C. The separated dyestuff is filtered off, washed neutral and dried. It dissolves in water with a violet-red coloration which, upon addition of formaldehyde, turns bluish. From a weak acid bath, the dyestuff dyes wool in bright violet shades of very good fastness to fulling and light.

Example 8

100 parts of p-tert. amyl phenol are melted, 15 parts of aqueous caustic soda solution added, and the temperature raised to 180° C., with elimination of water by distillation, whereupon 16 parts of 1 - amino - 2 - sulfo-4-isoduridino-anthraquinone (sodium salt) are introduced into the melt. Stirring is continued for 20 hours at 180° C., after which, following cooling to 100° C., dilution is effected with 150 parts of methanol. The base, which crystallizes out, is worked up analogously to the preceding examples.

10 parts of this base are dissolved in 80 parts of 9% oleum, and stirring continued at 40-45° C. until complete water-solubility is achieved. The dyestuff is then worked up as in the preceding examples.

It dissolves in water with a violet coloration and in concentrated sulfuric acid with a violet-tinged red coloration which, upon addition of formaldehyde, turns toward the blue. The dyestuff dyes wool, from a weak acid bath, in bright violet shades of excellent fastness to light and to fulling.

Example 9

Into 100 parts of p-tert. amyl phenol, a solution of 15 parts of caustic potash in 15 parts of water are poured, and then the water distilled off until the melt has been heated to a temperature of 150° C. 16.8 parts of 1-amino-2-bromo-4-mesidino-anthraquinone are then introduced, and stirring continued for 6 hours at 150° C. After cooling to 100° C., dilution is effected with 160 parts of methanol, cooling is allowed to continue down to room temperature, and the crystallized dyestuff base is filtered off. It is washed with alcohol, then with hot water and dried.

50 parts of the dyestuff base are introduced into 90 parts of sulfuric acid monohydrate and 50 parts of 28% oleum, the temperature being kept below 40° C. by cooling. The solution is stirred for a half hour at 40-45° C. A test specimen will then be soluble in water without residue. The solution is allowed to run into a mixture of 700 parts of ice, 700 parts of ice water and 140 parts of sodium chloride, the dyestuff which separates is filtered off, and is thoroughly pressed to remove adherent mother liquor. The dyestuff is stirred with a little water into the form of a thick pulp and is neutralized by the gradual addition of dry sodium carbonate. After drying, a dark violet powder is obtained which dissolves in water with a bright violet coloration. The dyestuff, corresponding to the formula

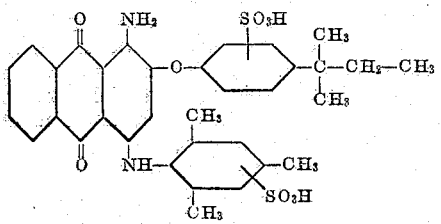

draws onto wool, from a weak acid bath, in bright violet shades of excellent fastness to fulling and to light.

Example 10

70 parts of p-tert. butyl phenol are melted, a solution of 8 parts of sodium hydroxide in 8 parts of water is added, and the water is then eliminated by distillation in a current of nitrogen until a temperature of 180° C. is reached. thereupon 13.35 parts of the sodium salt of 1-amino-2-sulfo-4-vic.-m-xylidino-anthraquinone are added.

The condensation, the separation of the dyestuff base, and its sulfonation are carried out after the manner described in Example 4.

There is obtained a dyestuff which dissolves in water with a bright violet coloration, and in concentrated sulfuric acid with a violet-red coloration. The dyeing on wool is a bright violet which is of good fastness to fulling and to light.

Example 11

9 parts of anhydrous potassium acetate are dissolved in 70 parts of melted iso-octyl phenol, and then 13.35 parts of the sodium salt of 1-amino-2-sulfo-4-vic.-m-xylidino-anthraquinone are added. The melt is heated to 200–205° C., whereby any water present distils off. The condensation is allowed to continue at 200–205° C. until a test specimen is completely insoluble in hot water. The dyestuff base is precipitated with alcohol, according to the procedure described in the preceding examples, and is filtered off.

5 parts of the dyestuff base are dissolved in 25 parts of sulfuric acid monohydrate, 12 parts of 28% oleum are added, and the mass heated at 40° C. until water-solubility is achieved. The dyestuff is recovered by pouring the mass into salt water, filtering and washing neutral. It dissolves in water with a violet coloration, and in concentrated sulfuric acid with a violet-red coloration which, upon addition of formaldehyde, turns blue. The obtained dyestuff corresponds to the formula

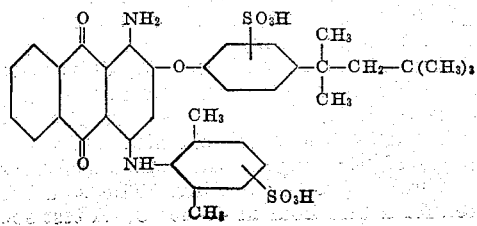

From a weak acid bath, it dyes wool in violet shades; the dyeings are of good fastness to fulling and to light.

Example 12

60 parts of p-cyclohexylphenol and 7 parts of sodium carbonate are heated to 190° C. and, after the introduction of 12 parts of the sodium salt of 1-amino-2-sulfo-4-mesidino-anthraquinone, stirring is continued for 30 hours at 190° C. The cooled melt is diluted with alcohol and the separated dyestuff base filtered off, washed and dried.

A solution of 5 parts of the dyestuff base in 40 parts of 10% oleum is stirred for an hour at 45° C. Working up as in the preceding examples yields a dyestuff which dissolves in water with a violet coloration and in concentrated sulfuric acid with a red coloration. The sulfuric acid solution turns toward the blue-violet upon addition of formaldehyde. Dyeings on wool are bright violet and fast to fulling and to light.

Example 13

100 parts of p-sec. amyl phenol, 12 parts of potassium carbonate and 12 parts of water are heated to 190° C. in a current of nitrogen, the water distilling off. 17 parts of the sodium salt of 1-amino-2-sulfo-4-mesidino-anthraquinone are added, and the melt is maintained at the said temperature until a test specimen is found to be completely water-insoluble. After cooling to 100° C., dilution is effected with 150 parts of methanol, and the precipitated dyestuff base suction filtered off, washed and dried.

The obtained dyestuff base (4 parts) is dissolved in 28 parts of 9% oleum, heated to 30–45° C. and stirring continued until a test specimen is completely soluble in cold water. The dyestuff, which corresponds to the formula

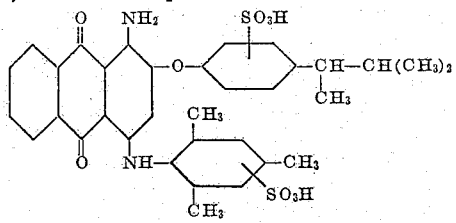

is worked up as in the preceding examples. Its solution in water is bright violet and in concentrated sulfuric acid red, turning blue upon addition of formaldehyde. Wool and silk are dyed bright violet therewith; the dyeings on wool are of outstanding wet fastnesses and of good light fastness.

By replacing, in this example, the 12 parts of potassium carbonate by the same amount of sodium carbonate or by 7 parts of sodium hydroxide, the same result is obtained.

By replacing the 100 parts of p-sec. amyl phenol by the same amount of o-tert. amyl phenol, a dyestuff possessing similar properties is obtained.

Having thus disclosed the invention, what is claimed is:

1. A dyestuff of the anthraquinone series corresponding to the formula

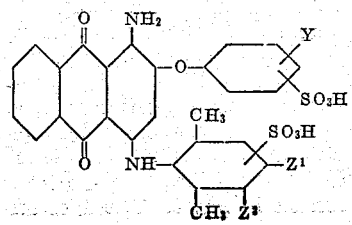

wherein Y stands for a member selected from the group consisting of alkyl containing 4 to 8 C-atoms and cyclo-hexyl, and $Z^1$ and $Z^2$ each stands for a member selected from the group consisting of hydrogen and methyl, and wherein $Z^2$ stands for hydrogen when $Z^1$ is hydrogen, and for a member selected from the group consisting of hydrogen and methyl when $Z^1$ is methyl.

2. A dyestuff of the anthraquinone series corresponding to the formula

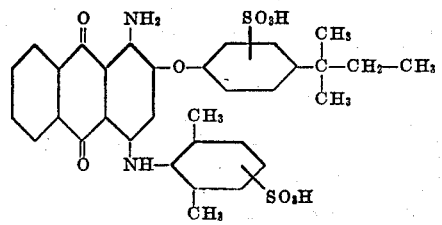

3. A dyestuff of the anthraquinone series corresponding to the formula

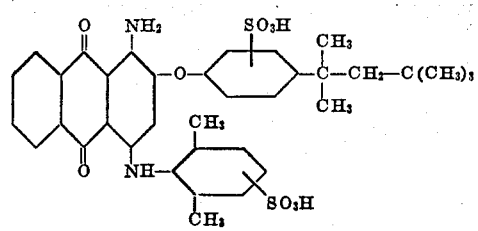

4. A dyestuff of the anthraquinone series corresponding to the formula

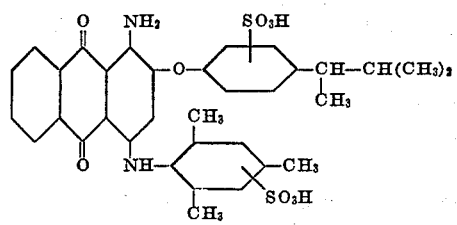

5. A dyestuff of the anthraquinone series corresponding to the formula

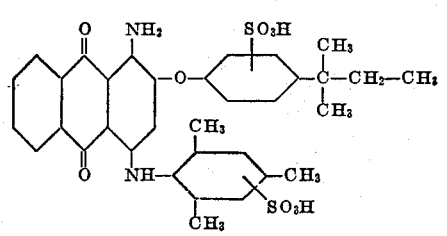

6. A dyestuff of the anthraquinone series corresponding to the formula

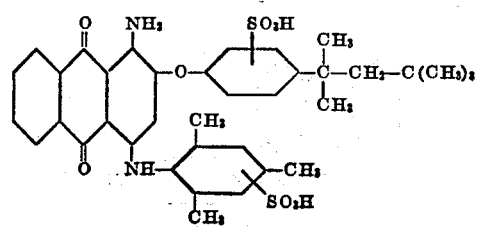

7. A process for the manufacture of a dyestuff of the anthraquinone series corresponding to the formula

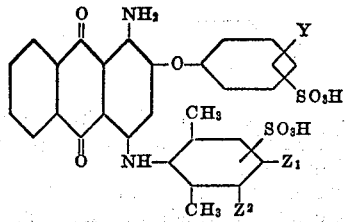

wherein Y stands for a member selected from the group consisting of alkyl containing 4 to 8 C-atoms and cyclo-hexyl, each of $Z^1$ and $Z^2$ stands for a member selected from the group consisting of hydrogen and methyl, and wherein $Z^2$ stands for hydrogen when $Z^1$ is hydrogen, and for a member selected from the group consisting of hydrogen and methyl when $Z^1$ is methyl, comprising the steps of condensing an amino-anthraquinone compound corresponding to the formula

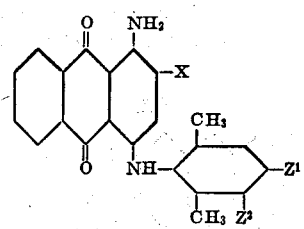

wherein X stands for a member selected from the group consisting of Br and $SO_3H$, and wherein $Z^1$ and $Z^2$ have the above-mentioned significances, with a phenol corresponding to the formula

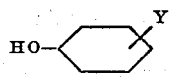

wherein Y has the above-mentioned significance, in the presence of an acid-binding agent, and of treating the resultant condensation product with a sulfonating agent.

8. A process for the manufacture of a dyestuff of the anthraquinone series corresponding to the formula

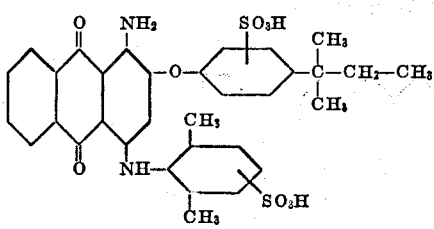

comprising the steps of condensing an amino-anthraquinone compound corresponding to the formula

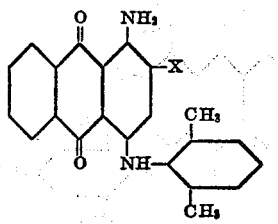

wherein X stands for a member selected from the group consisting of Br and SO₃H, with a phenol corresponding to the formula

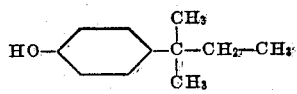

in the presence of an acid-binding agent, and of treating the resultant condensation product with a sulfonating agent.

9. A process for the manufacture of a dyestuff of the anthraquinone series corresponding to the formula

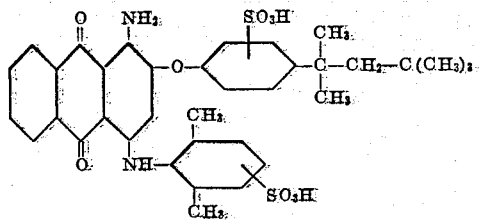

comprising the steps of condensing an aminoanthraquinone compound corresponding to the formula

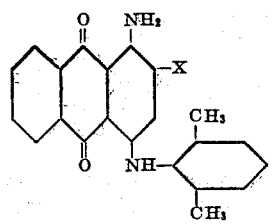

wherein X stands for a member selected from the group consisting of Br and SO₃H, with a phenol corresponding to the formula

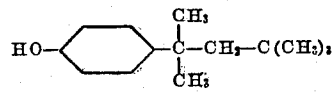

in the presence of an acid-binding agent, and of treating the resultant condensation product with a sulfonating agent.

10. A process for the manufacture of a dyestuff of the anthraquinone series corresponding to the formula

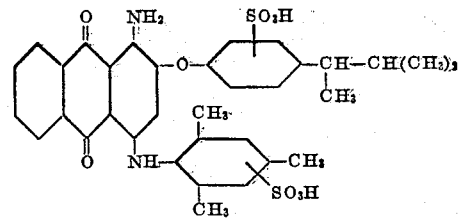

comprising the steps of condensing an aminoanthraquinone compound corresponding to the formula

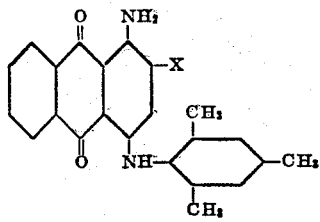

wherein X stands for a member selected from the group consisting of Br and SO₃H, with a phenol corresponding to the formula

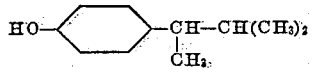

in the presence of an acid-binding agent, and of treating the resultant condensation product with a sulfonating agent.

11. A process for the manufacture of a dyestuff of the anthraquinone series corresponding to the formula

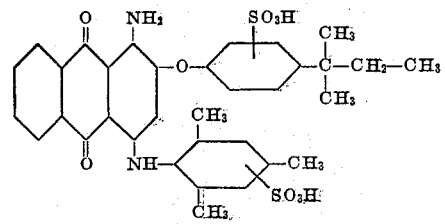

comprising the steps of condensing an aminoanthraquinone compound corresponding to the formula

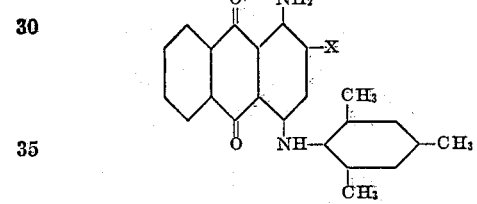

wherein X stands for a member selected from the group consisting of Br and SO₃H, with a phenol corresponding to the formula

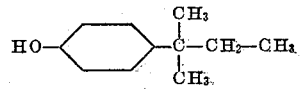

in the presence of an acid-binding agent, and of treating the resultant condensation product with a sulfonating agent.

12. A process for the manufacture of a dyestuff of the anthraquinone series corresponding to the formula

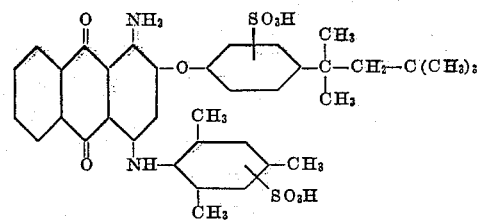

comprising the steps of condensing an aminoanthraquinone compound corresponding to the formula

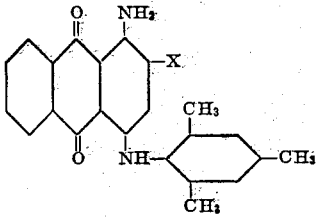

wherein X stands for a member selected from the group consisting of Br and SO₃H, with a phenol corresponding to the formula

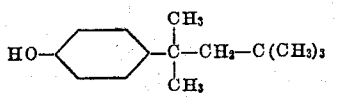

in the presence of an acid-binding agent, and of treating the resultant condensation product with a sulfonating agent.

ALBIN PETER.
JACQUES GÜNTHART.

REFERENCES CITED

The following references are of record in the file of this patent:

UNITED STATES PATENTS

| Number | Name | Date |
|---|---|---|
| 1,038,589 | Jacobi et al. | Sept. 17, 1912 |
| 2,113,054 | Lodge | Apr. 5, 1938 |
| 2,117,569 | Peter | May 17, 1938 |

FOREIGN PATENTS

| Number | Country | Date |
|---|---|---|
| 215,943 | Switzerland | Nov. 1, 1941 |